United States Patent

Cassem

[11] Patent Number: 5,842,301
[45] Date of Patent: Dec. 1, 1998

[54] FLASHLIGHT ATTACHMENT FOR FISHING POLES

[76] Inventor: Craig Jeffery Cassem, 2970 E. Gardner Rd., Gardner, Ill. 60424

[21] Appl. No.: 13,074

[22] Filed: Jan. 26, 1998

[51] Int. Cl.⁶ .................................................... A01K 87/02
[52] U.S. Cl. ................................................................ 43/25
[58] Field of Search .................. 43/25.2, 20, 25, 43/54.1; 206/315.11; 224/103, 35, 922

[56] References Cited

U.S. PATENT DOCUMENTS

| | | | |
|---|---|---|---|
| 3,026,644 | 3/1962 | Raider | 43/25 |
| 4,628,628 | 12/1986 | Burgin et al. | 43/54.1 |
| 5,092,075 | 3/1992 | Campos | 43/54.1 |
| 5,199,208 | 4/1993 | Matchette | 43/25.2 |
| 5,214,874 | 6/1993 | Faulkner | 43/25.2 |
| 5,297,676 | 3/1994 | Coleman | 206/315.11 |
| 5,598,658 | 2/1997 | Walker | 43/25 |

*Primary Examiner*—Thomas Price

[57] ABSTRACT

A lightweight flashlight attachment for fishing poles which will illuminate the end of a fishing pole and the fishing pole eyelets in darkness. The flashlight attachment includes a lightweight flashlight which can be quickly and easily attached to and detached from fishing poles and will remain attached to a fishing pole even when the pole is cast by the fisherman.

2 Claims, 1 Drawing Sheet

DRAWINGS FOR
FLASHLIGHT ATTACHMENT FOR FISHING POLES

FLASHLIGHT ATTACHMENT FOR FISHING POLES

BACKGROUND OF THE INVENTION

This invention relates to a flashlight attachment for fishing poles, and more particularly to a simple, lightweight flashlight attachment which will illuminate the end of a fishing pole in darkness.

When fishing at night, a fisherman has to keep the tip of the pole in view to determine when a fish is taking the bait. Normally, the fishing pole is illuminated with a lantern or a high powered flashlight positioned on the ground so the flashlight beam illuminates the pole. However, the high-level light emitted from the lantern or high-powered flashlight can soon attract mosquitoes and other bugs. Also, a flashlight positioned on the ground to illuminate the fishing pole must often be adjusted each time the fishing pole is moved by the fisherman in order to keep the flashlight beam positioned on the fishing pole.

There is a need for a form of lightweight flashlight attachment for a fishing pole which can be easily attached to a fishing pole which will illuminate the end of the pole with a low-level light.

Prior art devices of which the inventor is aware include those disclosed in the following United States Patents.

U.S. Pat. No. 2,283,430 discloses a flashlight used to illuminate reels of fishing rods.

U.S. Pat. No. 2,619,559 discloses an electrically operated signalling device adapted to be mounted on a fishing rod and including a movable member to be engaged and actuated by the fishing line to energize the signal when a pull is exerted on the line by a fish.

U.S. Pat. No. 2,631,792 discloses a clip member attached to a side member and a cross-tie rod of a fishing reel wherein the cross-tie member may be one cooperating with the reel level wind device and the clip will provide a finger piece. The clip might also be used to carry a flashlight.

U.S. Pat. No. 2,643,371 discloses a signal indicator for fishing lines which provides a simplified construction of attachment for fishing rods to provide a visual signal in the event of a pull on the fishing rod for indicating a bite or strike.

U.S. Pat. No. 2,671,209 discloses a fishing rod light with a vibratory switch sympathetic to external vibrations for intermittently closing the electrical circuit useful for night fishing to indicate a nibble on the fish bait at the end of the line.

U.S. Pat. No. 4,542,447 discloses a flashlight attachment for firearms.

U.S. Pat. No. 4,775,920 discloses a fishing pole for twilight, night and early morning use. The pole has a light source for providing rod glow to assist in monitoring rod movement, and a glow controller for selectively varying the intensity of rod glow to assist in baiting and other tasks.

U.S. Pat. No. 5,172,508 discloses an illuminated fishing rod having a self-contained light source. The rod includes a translucent pole and a handle connected to the pole. The handle has a cavity therein and which receives an end of the pole. A self contained light source, for example a hand-held flashlight, is removably housed within the cavity of the handle. A plurality of fiber optic cables may be received within the pole cavity to conduct light along the pole.

U.S. Pat. No. 5,179,797 discloses a night fishing tip light for a fishing rod which has a battery holder and a pair of wires that extend to an LED. The LED and the wire conductors are mounted by cable ties onto the side of the rod away from the fishing line.

U.S. Pat. No. 5,448,459 discloses a small, self contained light, swivel mounted on a clasp that will grip cylindrically shaped objects including pens, pencils, and fingers. The cone shaped light body includes a lens, reflector, bulb, battery, and switch which will provide light on an area approximately four inches distant.

BRIEF SUMMARY OF THE INVENTION

The flashlight attachment for fishing poles in accordance with the present invention is an improvement over the prior art in several respects. The invention provides a lightweight flashlight attachment for fishing poles having one or more of the following characteristics, namely, the ability to readily attach to or detach from a fishing pole in the matter of a few seconds; the ability to attach to and detach from most typical fishing poles; the ability to provide a light beam aligned with the fishing pole which illuminates the fishing pole including the eyelets of the fishing pole during periods of darkness such as dusk, nighttime, and dawn; the ability to remain attached to the fishing pole when the pole is cast by the fisherman; and the ability to be easily disassembled for fast replacement of batteries, bulbs, and the like.

The flashlight attachment for fishing poles in accordance with this invention includes a relatively low powered, lightweight flashlight commonly available which uses two AAA batteries, a length of vinyl foam cylinder tubing which is cut to the approximate length of the flashlight battery compartment and stretched over the flashlight battery compartment for a tight fit and which will not slip, two hook and loop straps (Velcro) constructed with polyethylene hooks on one side of the strap and nylon loops on the other side which allows the straps to be attached to themselves, and two ½" steel staples which attach the hook and loop straps to the vinyl foam cylinder tubing.

The flashlight attachment for fishing poles is attached to a fishing pole by positioning the flashlight parallel to the fishing pole so the beam from the flashlight points in the direction of the tip of the pole and the two hook and loop straps are wrapped securely around the fishing pole and attached to themselves. When the flashlight is attached to the fishing pole and is turned on, during darkness, the light from the flashlight will illuminate the fishing pole and the eyelets of the fishing pole. Since the flashlight is securely attached to the fishing pole, it will illuminate the pole, no matter what direction the pole is pointed.

The flashlight is a relatively low-level light source, therefore, mosquitoes and other flying insects are not as attracted to this light source as higher level light sources such as lanterns and high powered flashlights. Since the flashlight is positioned directly adjacent to the pole and relatively close to the end of the pole, the low powered lightweight flashlight adequately illuminates the end of the fishing pole and the eyelets of the fishing pole so a fisherman can see the tip of the fishing pole in darkness and determine when a fish is taking the bait. Typically, lanterns and high powered flashlights are used to illuminate a fishing pole at night. This is because the lantern or high powered flashlight is usually positioned on the ground a such a distance from the end of the fishing pole that only a strong light source will adequately illuminate the end of the fishing pole. Also, since the invention can be easily and quickly mounted to nearly any fishing pole and illuminate such pole without the pole itself being specially manufactured, it is an improvement over the prior art.

DETAILED DESCRIPTION OF THE INVENTION

Figure 1:
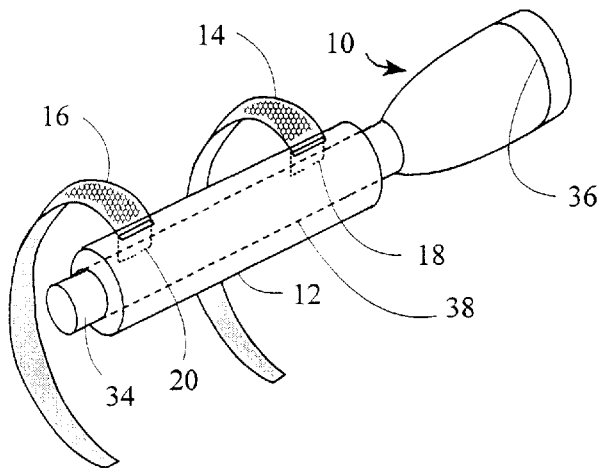
FIG. 1 is a perspective view of the flashlight attachment for fishing poles in accordance with the invention.

A flashlight attachment for fishing poles in accordance with this invention includes a relatively low powered lightweight flashlight commonly available which uses two AAA batteries 10 and a length of vinyl foam cylinder tubing 12 which is cut to the approximate length of the flashlight battery compartment 38 and is stretched to fit tightly over the flashlight battery compartment 38. Two hook and loop straps 14, 16 constructed with polyethylene hooks on one side of the strap and nylon loops on the other side of the strap which allows the straps to be attached to themselves are attached to the vinyl foam cylinder tubing with two ½" steel staples 18, 20. The steel staples 18, 20 are such a length that they can penetrate through the thickness of the vinyl foam cylinder tubing 12 and be bent parallel to and against the inside portion of the vinyl foam cylinder tubing 12 leaving a sufficient length of staple pressed against the inside portion of the vinyl foam cylinder tubing 12 to keep the hook and loop strap from easily being separated from the vinyl foam cylinder tubing 12.

Figure 2:
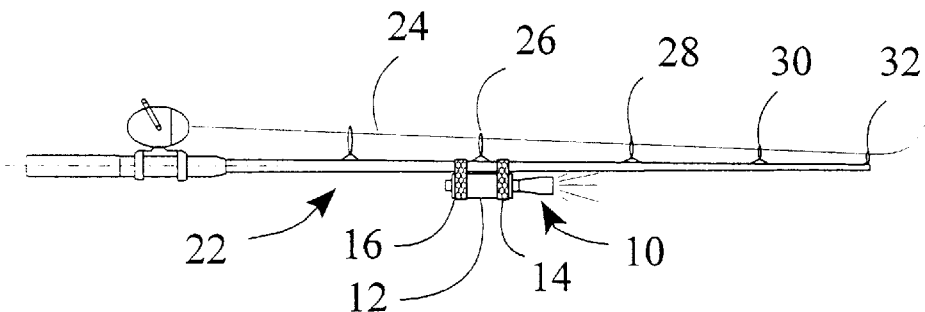
FIG. 2 is a side elevation view of a fishing pole equipped with the flashlight attachment.
Figure 3:
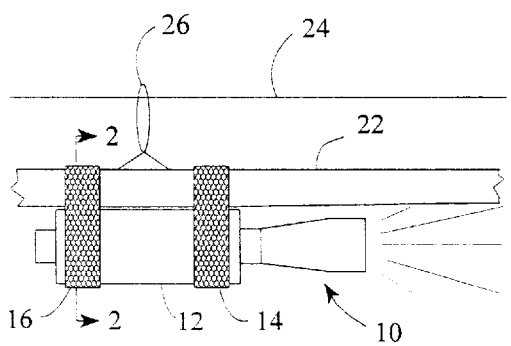
FIG. 3 is an enlarged side elevation view of the flashlight attachment and a portion of the fishing pole to which it is attached.
Figure 4:
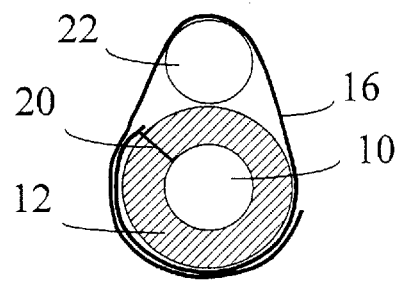
FIG. 4 is a sectional view on line 2—2 of FIG. 3.

As shown in FIGS. 2 and 3, the invention is attached to the fishing pole 22 by positioning the flashlight 10 parallel to the fishing pole 22 with the vinyl foam cylinder tubing 12 directly against the fishing pole 22 so the beam from the flashlight 10 points in the direction of the tip of the pole. The hook and loop straps 14, 16 are wrapped securely around the fishing pole 22 and under the fishing line 24 with one strap 14 positioned on one side of the eyelet of the fishing pole 26 and the other strap 16 positioned on the other side of the eyelet of the fishing pole 26 and attached to themselves. When the hook and loop straps 14, 16 are securely wrapped around the fishing pole 22 and are attached to themselves, the vinyl foam cylinder tubing 12 presses against the fishing pole 22 which keeps the flashlight beam pointed in the direction of the tip of the fishing pole and prevents the flashlight attachment from coming off of the fishing pole 22 even when a fisherman casts the fishing pole 22. When the flashlight 10 is turned on and positioned in the manner just described, the fishing pole 22 and the eyelets of the fishing pole 28, 30, 32 are illuminated by the light beam from the flashlight 10. This allows a fisherman to see the end of the fishing pole 22 in darkness and determine when a fish is taking the bait.

The flashlight attachment is positioned under the fishing line 24 and against the fishing pole 22 in such a manner that it does not interfere with the casting or retrieval of the fishing line 24. The flashlight attachment is lightweight enough so it does not interfere with the operation of the fishing pole 22 such as the casting or retrieving of the bait. The vinyl foam cylinder tubing 12 is positioned on the flashlight 10 in such a manner that the battery compartment screw cap 34 can be easily removed to replace batteries and the flashlight lens cap 36 can be easily removed to replace flashlight bulbs.

It should be understood, of course, that the foregoing disclosure relates to only a preferred embodiment of the invention and that numerous modifications or alterations may be made without departing from the spirit and scope of the invention as set forth in the appended claims.

I claim:

1. A flashlight attachment for fishing poles comprising a flashlight and an attachment means for securing the flashlight to a fishing pole for the purpose of illuminating the end of the pole and the eyelets of the fishing pole during darkness, wherein said attachment means for securing the flashlight to a fishing pole includes a length of vinyl foam cylinder tubing stretched to fit tightly over a flashlight battery compartment, and includes two lengths of hook and loop straps constructed with polyethylene hooks on one side of the strap and nylon loops on the other side which when looped around the fishing pole and are attached to themselves, thus securely attaching the flashlight to the fishing pole, and where said hook and loop straps are attached to the vinyl foam cylinder tubing with steel staples.

2. A flashlight attachment for fishing poles as set forth in claim 1 where said flashlight is a typical hand held flashlight which operates on two AAA batteries.

\* \* \* \* \*